(12) United States Patent
Lyon

(10) Patent No.: US 6,797,253 B2
(45) Date of Patent: Sep. 28, 2004

(54) CONVERSION OF STATIC SOUR NATURAL GAS TO FUELS AND CHEMICALS

(75) Inventor: Richard K. Lyon, Fargo, ND (US)

(73) Assignee: General Electric Co., Schenectady, NY (US)

(*) Notice: Subject to any disclaimer, the term of this patent is extended or adjusted under 35 U.S.C. 154(b) by 228 days.

(21) Appl. No.: 09/992,004

(22) Filed: Nov. 26, 2001

(65) Prior Publication Data

US 2003/0099594 A1 May 29, 2003

(51) Int. Cl.[7] .................................................. C01B 3/26
(52) U.S. Cl. .................... 423/652; 423/653; 423/654; 252/373
(58) Field of Search ............... 252/373; 423/244.1, 423/244.08, 244.02, 652, 653, 654

(56) References Cited

U.S. PATENT DOCUMENTS

| | | |
|---|---|---|
| 1,128,804 A | 2/1915 | Mittasch et al. |
| 1,711,036 A | 4/1929 | Beekley |
| 1,973,590 A | 9/1934 | Weaton et al. |
| 2,565,395 A | 8/1951 | Scharmann |
| 3,690,550 A | 9/1972 | Hiberath et al. |
| 4,388,877 A | 6/1983 | Molayem et al. |
| 4,400,356 A | 8/1983 | McVay et al. |
| 4,539,310 A * | 9/1985 | Leftin et al. .............. 502/303 |
| 5,130,100 A | 7/1992 | Serizawa |
| 5,339,754 A | 8/1994 | Lyon |
| 5,653,106 A | 8/1997 | Katashiba et al. |
| 5,827,496 A | 10/1998 | Lyon |

FOREIGN PATENT DOCUMENTS

| | | |
|---|---|---|
| GB | 2 272 430 | 5/1994 |
| JP | 49-51189 | 5/1974 |
| JP | 58-156192 | 9/1983 |
| JP | 59-102801 | 6/1984 |
| RU | 706 102 | 1/1980 |

OTHER PUBLICATIONS

Yang et al., Reactor Trap to Remove Hydrocarbons From Engine Environ. Sci. Technol., vol. 26, No. 8 pp. 1561–1564 (1994, no month).

Ishida, M. et al., A Novel Combustor Based on Chemical—Looping Reactions and Its Reaction Kinetics, Journal of Chemical Engineering of Japan, vol. 27, No. 3, pp. 296–301 (Jun. 1994).

(List continued on next page.)

*Primary Examiner*—Stanley S. Silverman
*Assistant Examiner*—Maribel Medina
(74) *Attorney, Agent, or Firm*—Nixon & Vanderhye P.C.

(57) ABSTRACT

A new cost effective and thermally efficient process for converting nearly valueless resources, such as "static," lower quality sour natural gas containing hydrogen sulfide, to useable fuels and chemicals, such as hydrogen, methanol and high cetane diesel fuel. The preferred method and apparatus can be used to treat conventional sour gas, i.e., gas having a ratio of $H_2S$ to $CH_4$ of at least 0.1 moles and preferably of at least 0.33 moles/mole, using a reforming catalyst and a sulfur capture agent. The process nominally can be carried out using two reactors that repeatedly cycle reactants between two basic process steps—reforming, and air regeneration.

11 Claims, 4 Drawing Sheets

Reforming Step, Phase 1

OTHER PUBLICATIONS

Bhattacharyya, et al., Catalytic Sox Abatement of FCC Flue Gases, Preprints of Papers Presented at the 194th Nat'l Meeting of the American Chemical Society, vol. 32, No. 4 (Aug. 31–Sep. 4, 1987).

Ishida, et al., *Evaluation of a Chemical–Looping–Combustion Power–Generation System by Graphic Exergy Analysis*, Energy, vol. 12, No. 2, 147–154 (1987). No month.

Lemieux, et al., *Minimization of Transient Emissions from Rotary Kiln Incinerators*, Prepared for Submission to Combustion Science and Technology, Aug. 2, 1989, (Revised Jan. 5, 1990).

Lyon, *Unmixed Combusion: A New Technology For Prevention of Puffing By Rotary Kiln Incinerators and Other Applications*, American Chemical Society, vol. 38, No. 2, Preprints of Papers Presented at the 205th ACS National Meeting in Denver, Colorado (Mar. 28–Apr. 2, 1993).

Richter, et al., *Reversibility of Combustion Processes*, Second Law Analysis of Processes, ACS Symposium Ser. 235, 71–86 (1983) No month.

*Chemical Abstracts*, vol. 100, 174 (1984). (No month given).

Wendt et al, *Mechanisms Governing Transients from the Batch Incineration of Liquid Wastes in Rotary Kiln*, Combustion Science and Technology, vol. 71, 169–185 (1988) (no month).

Wendt, et al., *Prediction of Transient Behavior During Batch Incineration of Liquids Wastes in Rotary Kiln*, Hazardous Waste & Hazardous Materials, Liebert, Inc. Publ., vol. 7, No. 1(1990). Nov.

Curran et al., $CO_2$ *Acceptor Gasification Process: Studies of Acceptor Properties*, Advances in Chemistry Series 69, American Chemical Society, pp. 141–165 (Sep. 1966).

Bett et al., Power Systems Div. United Technologies Corp., *Evaluation of Adiabatic Reformer In Mixed–Gas–Cycle*, Department of Defense Report No. AD–A134224 (Jun. 1983).

\* cited by examiner

Reforming Step, Phase 1

Reforming Step, Phase 2

Regeneration Step, First Phase

Air Regeneration, Second Phase

CONVERSION OF STATIC SOUR NATURAL GAS TO FUELS AND CHEMICALS

The present invention relates to a novel and cost effective process for converting sour natural gas which may also be static and poor, i.e. natural gas which containing hydrogen sulfide and which may also be remotely located and contain substantial amounts of nitrogen and/or carbon dioxide, to useable fuels and chemicals, such as hydrogen, methanol and high octane diesel fuel. More particularly, the present invention relates to a method and apparatus for treating "sour natural gas, i.e., gas having a ratio of $H_2S$ to $CH_4$ of at least 0.1 moles $H_2S$ per mole $CH_4$ and preferably of at least 0.5 moles/mole, using a reforming catalyst and a sulfur capture agent. Preferably, the process according to the invention can be carried out using two reactors that repeatedly cycle reactants between three basic process steps—reforming, air regeneration and fuel reduction.

BACKGROUND OF THE INVENTION

A large fraction of the world's total natural gas reserves has the problem of being "sour" in that they contain substantial amounts of $H_2S$, which is both highly toxic and tends to embrittle steel pipelines, making the transport of gases by pipeline highly dangerous and unreliable due to the possibility of leakage in the gas lines and transport equipment. Much of world's total natural gas reserves also has the problem of being "static," i.e., the gas is located in remote geographic regions that make it uneconomical to transport the gas via pipeline or to refine and/or condense the gas on site and ship it to market in liquid form. The world's total natural gas reserves also include much that is poor in quality because the methane and other combustible gas components are diluted with non-combustible $CO_2$ and $N_2$, making the unrefined gas a relatively low Btu fuel source.

Thus, for many years, the need has existed to convert sour natural gas which may also be static and/or poor into a more valuable commercial product which could then be transported in large quantities by inexpensive means (preferably by ship). The current state of industrial practice with sour natural gas that is also static and poor is illustrated by Exxon's development of the Natuna gas fields located in the middle of the South China Sea. Because the natural gas deposits contain high percentages of $CO_2$ and $H_2S$, the gas is considered both poor and sour. In this project the $CO_2$ and $H_2S$ are removed by liquefying and fractionally distilling the gas. This approach, while technically feasible, is very expensive. The static gas problem was resolved by developing a local use for the gas on site, namely as a fuel for use in producing steam for secondary oil recovery in the same remote geographic location. The Exxon approach made good economic sense because it began with two low value natural resources (a static, poor quality sour gas field and a depleted oil field) and finished with a relatively high quality crude oil end product using secondary oil recovery techniques.

In principle, it is possible to use fractional distillation processes to purify poor sour gas, followed by a conventional steam reforming process to convert the purified gas into a mixture of CO and hydrogen (commonly known as "syngas"). The syngas can then be converted into liquid hydrocarbons via the well-known Fischer-Tropsch process or to other commercially useful products such as methanol. This conventional gas reforming approach, however, has a number of significant disadvantages.

For example, liquefaction and fractional distillation of natural gas consumes a great deal of energy as part of the process, and thus requires a high capital expense for the equipment necessary to carry out such techniques. In addition, since steam reforming is economical only in large scale applications, a given gas resource may not be large enough to sustain the cost of a steam reformer. Furthermore, steam reforming is an endothermic reaction and in the conventional steam reforming process the heat consumed by the reaction is supplied by heating the outside of the reactor. This requires that the walls of the reactor be at a temperature equal to or greater than the temperature at which the steam reforming reaction occurs. This temperature is substantially above the temperature at which conventional steels begin losing their mechanical strength and resistance to corrosion.

As a result, conventional steam reforming normally requires processing equipment formed from expensive superalloy metals. The operating pressure at which the steam reforming process takes place must also be reduced. That is, even though the natural gas issuing from a well head may be at a pressure high enough for use in the Fischer-Tropsch process, the chemical composition of such gases does not allow for their direct use with Fischer-Tropsch. Thus, although steam reforming can produce gas of the appropriate composition, the reforming process requires first depressurizing the gas. Compressing the syngas back up to the pressure needed for the Fischer-Tropsch process can be prohibitively expensive.

In addition to these specific disadvantages, a general problem exists with conventional steam reforming processes in that many sour gas resources are found in regions of the world which lack the infrastructure necessary to support complex industrial processes. By necessity, the only practical industrial operations in such regions are those which are relatively simple to install, operate and maintain. Further, if a natural gas resource is poor in quality because it contains substantial amounts of nitrogen but not a significant amount of $CO_2$, no economically viable process exists within the present state-of-the-art to easily purify the gas on site. The only known approach is to treat the entire gas stream and remove the nitrogen using conventional (but very expensive) processing means.

On the other hand, if the natural gas is poor in quality because of a high rather than low $CO_2$ content, then in some situations the $CO_2$ can be put to advantageous use. It is known that nickel-based catalysts used in steam reforming can also be used with $CO_2$ in the reforming of methane. An article by Tomishge et al, *Catalysis Today* 45, 35–39, (1988) discusses the $CO_2$ reforming of $CH_4$ and notes the advantage of utilizing both the $CO_2$ and $CH_4$ components of the natural gas. While nickel-based catalysts are the most widely used reforming catalysts, the literature reports a number of other noble metal catalysts that can serve as active reforming catalysts (see, for example, the article by Craciun et al, *Catalysis Letters* 51, 149–151, 1998).

Prior art U.S. Pat. No. 5,827,496 teaches a method of supplying heat to packed bed reactors which are used to carry out endothermic reactions such as steam reforming. In this method, heat is generated inside the reactor by alternately reducing and oxidizing a material which in the reduced state is readily oxidized and in the oxidized state is readily reduced. This method is called "Autothermal Cyclic Reforming (ACR) or "Unmixed Reforming" (UMR).

The examples in the '496 patent show the production of hydrogen by steam reforming with a nickel catalyst in the presence of CaO. The CaO captures $CO_2$ by forming $CaCO_3$ in an exothermic process. While the $CaCO_3$ formation supplies the heat consumed by the steam reforming process, $CaCO_3$ must be regenerated in an endothermic process. In order to supply the heat necessary to regenerate the $CaCO_3$, air is passed through the bed, oxidizing the nickel catalyst to NiO in a strongly exothermic process. The NiO is then reduced back to nickel and the production of hydrogen is resumed. Example 8 of the '496 patent describes a process for steam reforming diesel fuel to which thiophene has been added to a level of 2000 ppm sulfur by weight, producing an output hydrogen gas containing only 5 ppm $H_2S$. Thus, the '496 patent teaches that the process could produce hydrogen that is significantly lower in sulfur content than the fuel being reformed.

The process described in the '496 patent has two significant limitations. First, the patent is concerned solely with the reforming of materials in which the sulfur content is very low, i.e., an impurity and/or minor component. In sour gas, however, sulfur in the form of $H_2S$ is often a major constituent. Second, the '496 reference is limited to methods of generating heat within a reactor in which by the sequential oxidation and reduction of a material which in the reduced state is readily oxidized and which in the oxidized state is readily reduced. In no wise does '496 teach show or suggest the generation of heat by selectively oxidizing one low value component (i.e. the $H_2S$) of the natural gas while retaining the $CH_4$ and other high value components.

Objects and Brief Description of the Invention

The steam reforming of a fuel is an endothermic reaction. Supplying the heat which is consumed by this reaction requires either burning some other fuel or burning part of the fuel being processed. In addition to the heat consumed directly by the steam reforming reaction doing steam reforming requires raising steam. This steam raising also requires either burning some other fuel or burning part of the fuel being processed. A sour natural gas is a mixture of fuels, the methane and other hydrocarbons it contains being valuable components and the $H_2S$ being of little or negative worth. Oxidation of the $H_2S$ will, however, liberate substantial amounts of heat.

It is a goal of the present invention to provide a means whereby the heat of oxidation of $H_2S$ is used to supply part or all of the heat consumed by the steam reforming of the natural gas. It is a further goal of the present invention to do said supplying of heat in a manner that allows the steam reforming reaction to be done at high pressure. Said high pressure operation reduce or eliminates the need to compress the gases produced by steam reforming before putting them to some use, e.g. producing hydrocarbons via the Fischer-Tropsch process. It is a still further goal of the present invention to minimize or completely avoid air polluting emissions of sulfur dioxide, to provide some or all of the heat needed to raise steam without burning methane or other high value components of the natural gas, to provide some or all of the electrical energy needed without burning methane or other high value components of the natural gas.

Unlike the above prior art, the present invention provides a novel and cost-effective means whereby sour gas (which may also be poor and static) is converted to liquid hydrocarbons, methanol, and/or other valuable fuel materials that can readily be treated on site and then transported to market in a safe and reliable manner using conventional steel pipelines. The preferred method according to the invention has been found to be most effective for treating sour gas having a ratio of $H_2S$ to $CH_4$ of at least 0.1 moles $H_2S$ per mole $CH_4$ and preferably at least 0.33 moles/mole.

DETAILED DESCRIPTION OF THE INVENTION

Figure 1:
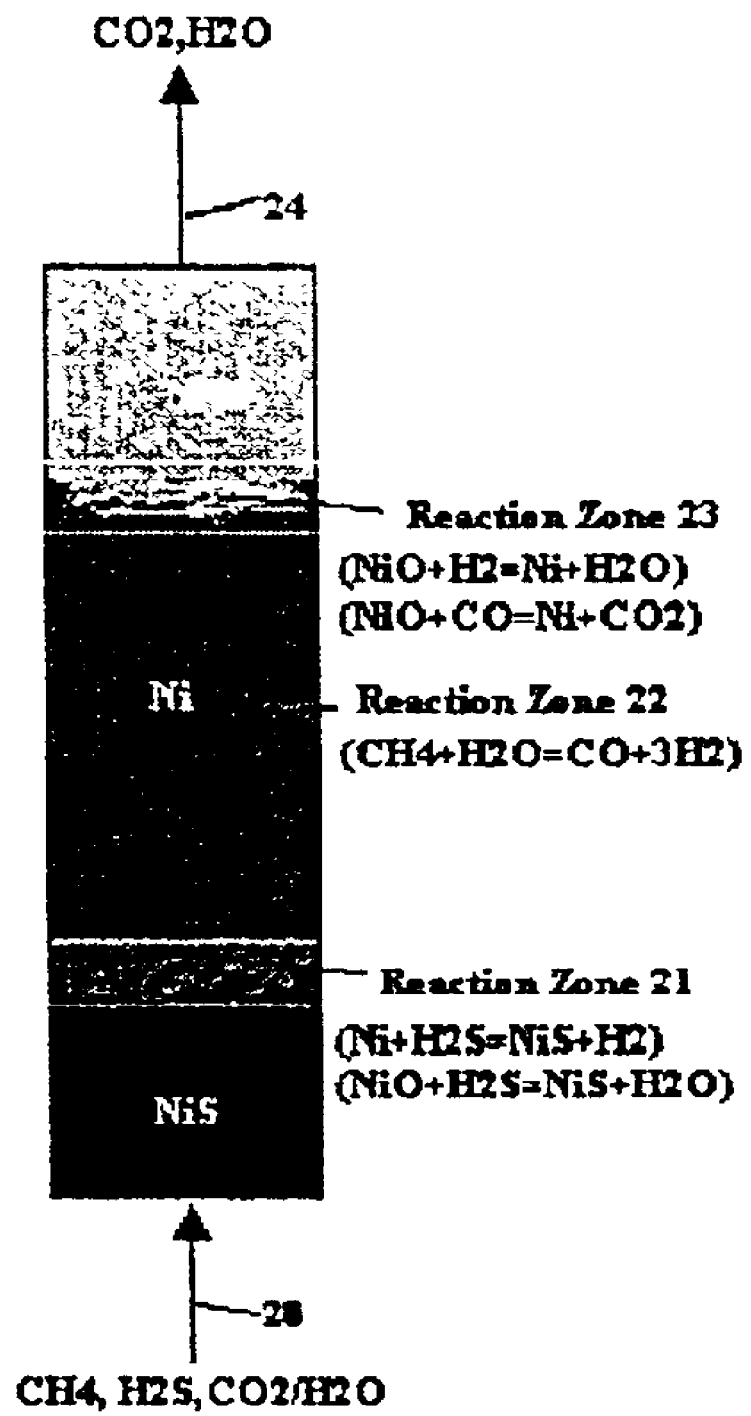
FIGS. 1, 2, 3, and 4 depict the steps of an exemplary Autothermal Cyclic Reforming process in accordance with the invention, together with an identification of the process streams entering and leaving the reactor during each step.
Figure 2:
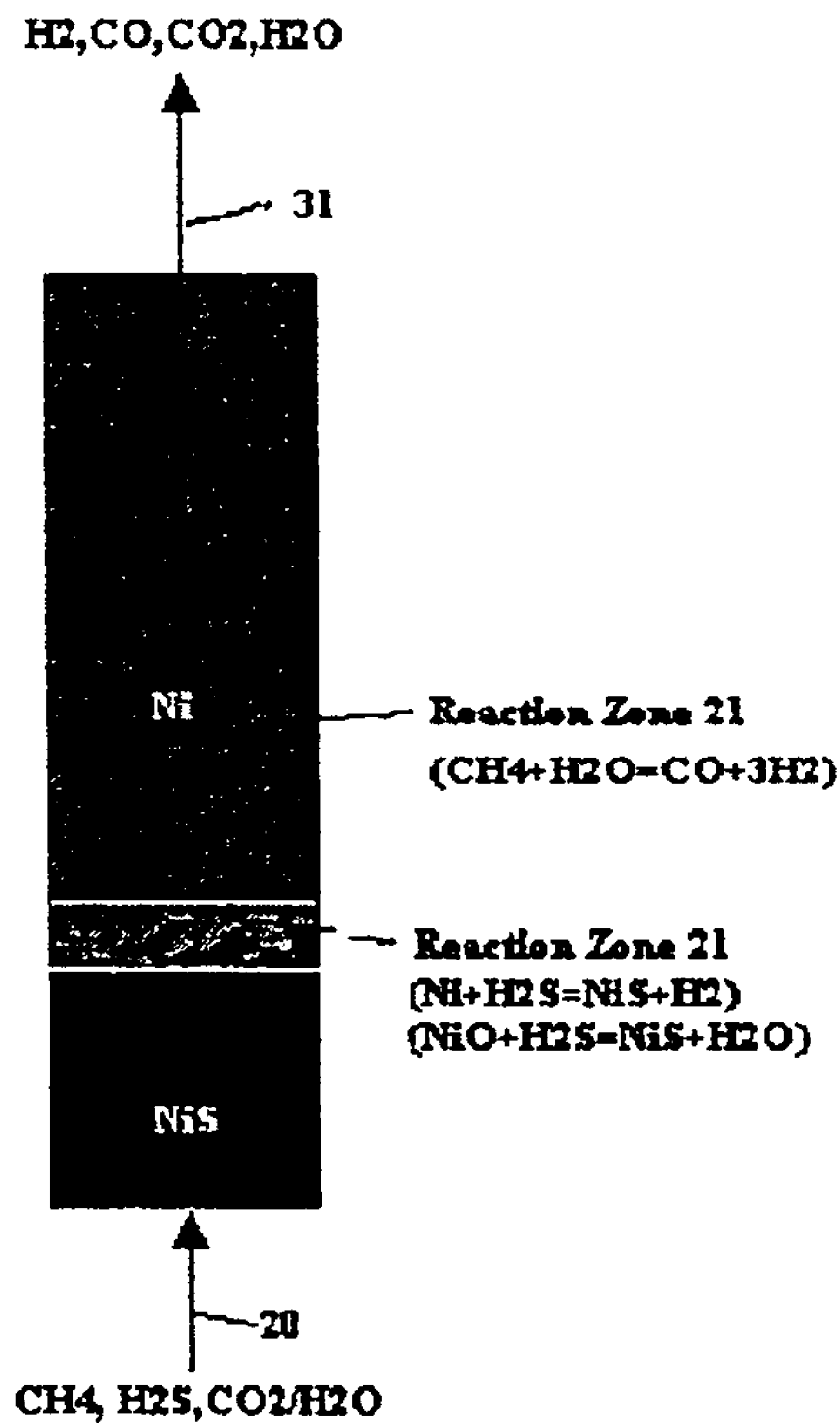

In one embodiment of the invention, the ACR uses one or more reactors containing a bed of a nickel-based catalyst supported on alumina. In each reactor a cyclic two step process occurs repeatedly, each of these two steps having two distinct phases. As shown in FIGS. 1, 2, 3 and 4 the process involves reforming, first phase, reforming second phase, air regeneration, first phase and air regeneration second phase. At the start of the first step (reforming, first phase) the nickel in the nickel-based catalyst is present as NiO. A mixture of steam and sour natural gas is passed through the reactor as reformer feed 20. The sour natural gas enters at an inlet, flows through the reactor, and out an outlet. As the gas flows, three sets of reactions occur, causing three reaction zones to form and move through the reactor from the inlet toward the outlet. The most rapid of these reaction zones is reaction zone 23 in which NiO is reduced to Ni. Initially the $CH_4$ component of the natural gas is chiefly responsible for the reduction ($CH_4+4NiO=4Ni+CO_2+2H_2O$). As the NiO reduction zone moves through the reactor, however, the amount of nickel catalyst downstream of the reduction zone increases, forming reaction zone 22 in which the $CH_4$ undergoes the steam reforming reaction to produce hydrogen and CO. The hydrogen and CO thus formed contribute to the reduction of NiO to Ni in downstream reaction zone 23.

The $H_2S$ component of the natural gas is removed in reaction zone 21. In this zone $H_2S$ undergoes reaction with both the NiO initially present in the reactor and with the Ni produced subsequently, $H_2S+NiO=NiS+H_2O$ and $H_2S+Ni=NiS+H_2$. The hydrogen thus formed also contributes to the reduction of NiO in reaction zone 23 can react with NiO, via $NiO+H_2=Ni+H_2O$.

The net results of these reactions is that for every mole of $H_2S$ input to the reactor one mole of NiS is produced and for every mole of $CH_4$ input to the reactor four moles of Ni are produced.

As the input of natural gas continues, both the section of the bed which have converted to NiS and the section of the bed converted to Ni grow longer. Reaction zone 23 reaches the end of the bed, i.e. the initially present NiO is all or nearly all reduced to Ni, the composition of the output gases changes. At this point the reforming step goes from phase 1 to phase 2, i.e. the composition of the output gases changes. During phase 1 the output gas was wet $CO_2$ but during phase 2 the output gas is an equilibrium mixture of $H_2$, $H_2O$, CO, $CO_2$, and $CH_4$. For the steam reforming of $CH_4$ by itself the phase 2 output gases would have a ratio of $(2CO+3CO_2)/H_2=0.75$ but the desired value of this ratio for syngas is 1. Thus for a sour gas containing little or no $CO_2$ it may be useful to include some or all of wet $CO_2$ produced during the phase 1 part of the reforming step and thereby increase the value of this ratio toward the desired value of 1. For a sour gas containing substantial amounts of $CO_2$ it may be more useful not to include the phase 1.

Figure 3:
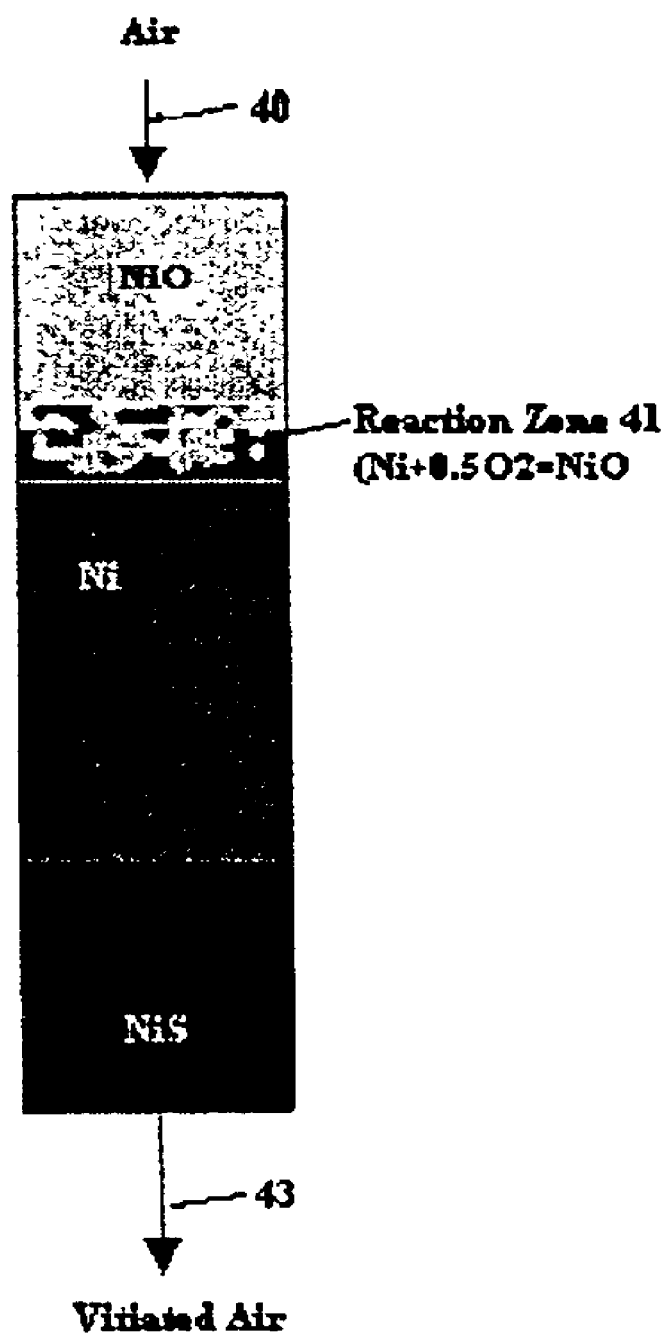
Figure 4:
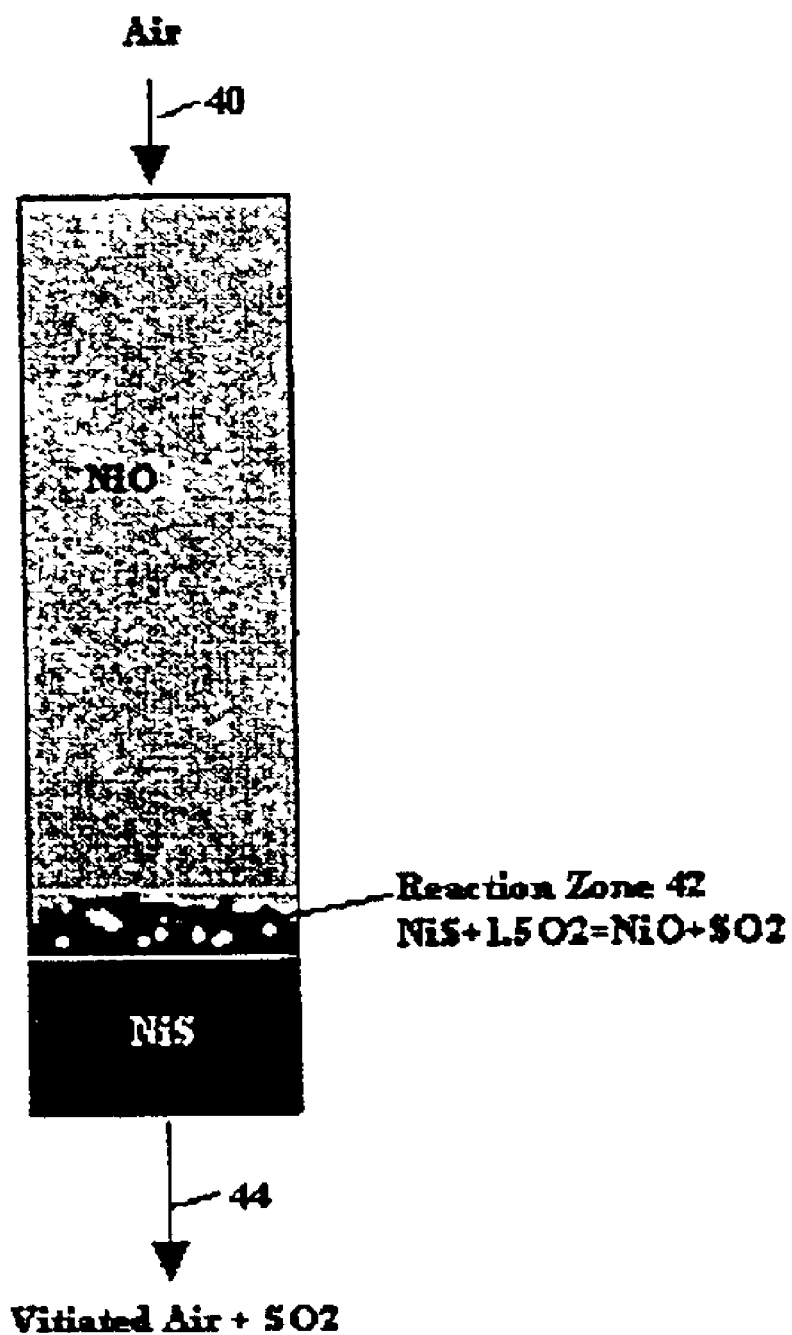

Before all of the Ni in the reactor is converted to NiS the reforming step is halted and the regeneration step, phase 1 is begun. As shown in FIG. 3 in phase 1 of this step air (40) is passed through the reactor oxidizing the Ni to NiO in reaction zone 41, and vitated air, 43, leaves the bed. When reaction zone 41 reaches the NiS formed during the reforming step, it changes to reaction zone 42. As shown in FIG.

4 the output gas, 44 becomes vitiated air and $SO_2$. Depending on the users circumstances it may be advantageous to combine or keep separate the output gases produced in phases 1 and 2 of the regeneration step.

The time of switch from the reforming step to the regeneration step is chosen so as to maintain heat balance between the endothermic steam reforming reaction and the exothermic oxidation of the Ni and NiS.

In the embodiment discussed above the nickel based catalyst served both as a steam reforming catalyst and as a sulfur capture agent. In other embodiments either or both of these functions could be performed by other materials. Noble metal based steam reforming catalysts are well known in the art. Instead of using Ni/NiO as sulfur capture agent a number of other materials may be used. MnO CoO CdO and ZnO can capture $H_2S$ by forming MnS CoS, CdS and ZnS respectively., $Fe_2O_3$ can form FeO in a reducing atmosphere, the FeO can capture $H_2S$ by forming FeS which on oxidation will reform $Fe_2O_3$. CuO can both capture $H_2S$ and be reduced to Cu which can also capture $H_2S$, both capture reactions forming CuS which can readily be oxidized to CuO.

In the embodiment shown in FIGS. 1, 2, 3, and 4 two reactors and switching valves may be used to produce a continuous stream of syngas by repeatedly cycling between the above two steps. When one reactor is in the reforming step, the other reactor operates in phase 1 and then phase 2 of the air regeneration step followed by the reduction step.

The primary reactions that occur in each step depicted in FIG. 1 and their heats of reaction at 700° C. are summarized below:

Reforming Step
(Syngas formation over nickel catalyst and sulfur capture)

| | |
|---|---|
| $CH_4$ (g) + $H_2O$ (g) = CO (g) + $3H_2$ (g) | $\Delta H_{rxn}$ = +225.36 kJ/mol |
| $CH_4$ (g) + $CO_2$ (g) = 2CO (g) + $2H_2$ (g) | $\Delta H_{rxn}$ = +260.06 kJ/mol |
| CO (g) + $H_2O$ (g) = $CO_2$ (g) + $H_2$ (g) | $\Delta H_{rxn}$ = −34.70 kJ/mol |
| NiO + $H_2S$ (g) = NiO + $H_2O$ (g) | $\Delta H_{rxn}$ = −63.97 6kJ/mol |
| 4NiO + $CH_4$ (g) = $CO_2$ (g) + 2 $H_2O$ (g) + Ni | $\Delta H_{rxn}$ = +140.24 kJ/mol |

Air Regeneration Step
(Nickel oxidation and sulfur release)

| | |
|---|---|
| Ni + ½ $O_2$ (g) = NiO | $\Delta H_{rxn}$ = −235.22 kJ/mol |
| NiS + 1.5$O_2$ (g) = NiO + $SO_2$ (g) | $\Delta H_{rxn}$ = −455.83 kJ/mol |

Thermodynamic calculations for the process steps according to the invention were done using an HSC computer program with the following results. A sour gas having a ratio of $H_2S$ to $CH_4$ of at least 0.1 moles, and preferably at least 0.5 moles/mole is contacted with a reforming catalyst and a sulfur capture agent at a temperature of at least 500° C. The reforming catalyst may be either a nickel-based reforming catalyst or a noble metal reforming catalyst. The sulfur capture agent may include an additional amount of the nickel-based reforming catalyst or any of several metal-based catalysts, including $Fe_2O_3$, MnO, CuO, CoO, CdO and ZnO. These sulfur capture agents may be used either as the neat material or supported on an inert carrier.

The heat balance of the system is effected by both the choice of reforming catalyst, nickel-based or noble metal based, and by the choice of the sulfur capture agent. Cycling the nickel based catalyst from oxidizing to reducing to oxidizing conditions causes it to cycle from NiO to Ni and back to NiO. This process liberates heat, $\Delta H$=−800.62 kj per $CH_4$ consumed. This heat release together with the heat released by capturing $H_2S$ and releasing it as $SO_2$ provides the heat consumed by the endothermic steam reforming reaction, making it unnecessary to supply heat from outside the reactor.

The heat provided by capturing $H_2S$ and releasing it as $SO_2$ is heat that would otherwise go to waste. The heat provided by cyclic oxidation and reduction of NiO/Ni, however, comes at the expense of $CH_4$ consumption. This consumption occurs both directly by reaction of $CH_4$, and indirectly by consumption the $H_2$ and CO produced by reforming the $CH_4$.

Cycling a noble metal based catalyst from oxidizing to reducing to oxidizing conditions does not consume $CH_4$ or liberate heat. For the sulfur capture agents MnO, CoO, CdO and ZnO the metal remains in a plus 2 valance state as the agent cycles between oxide and sulfide. For these agents the net reaction is $H_2S+1.5O_2=H_2O+SO_2$ with a heat release of $\Delta H$=−519.80 kj/mole. When the sulfur capture agents CuO or $Fe_2O_3$ are cycled between oxidizing and reducing conditions, metals do change valance. This consumes $CH_4$ and liberates heat.

The equilibrium composition for steam reforming of one mole of $CH_4$ with 4 moles of steam at 700° C., and 5 bars is 3.0192 moles of $H_2$, 2.661 moles of $H_2O$, 0.34115 moles of CO, 0.49893 moles of $CO_2$, and 0.15992 moles of $CH_4$. For producing this equilibrium mixture $\Delta H$=+172.00 kj per mole of $CH_4$ input. For a sour natural gas in which the ratio of $H_2S$ to $CH_4$ is greater than 172.00/519.80=0.33, the heat released by capturing the $H_2S$ as a sulfide and oxidizing that sulfide is more than sufficient to supply the heat consumed by the steam reforming of the $CH_4$. Even for a sour gas with a ratio of $H_2S$ to $CH_4$ of only 0.1, capturing the $H_2S$ as a sulfide and oxidizing that sulfide supplies 30% of the heat consumed by the reforming process.

Steam and/or $CO_2$ from another source may also be added to the natural gas to adjust the composition of the gas during contact with the catalyst. Preferably, the syngas should have a ratio of about 1 for $(2CO+3CO_2)/H_2$. In order to produce that preferred ratio, for every molecule of $CH_4$ undergoing $CO_2$, 2 molecules of $CH_4$ must undergo steam reforming.

During contact with the sour natural gas, the sulfur capture agent forms a sulfide. During contact with air, the sulfide is oxidized to $SO_2$, which in turn is swept out of the reactor along with the oxygen-depleted air. If the air is not completely depleted of oxygen, or if undepleted air is added, it can be passed through a bed of $CaCO_3$ where the reaction $CaCO_3+SO_2+0.5O2=CaSO_4+CO_2$ will remove virtually all of the $SO_2$. The reaction $CaCO_3+SO_2+0.5O2=CaSO_4+CO_2$ is strongly exothermic, the heat of reaction at 700° C. being −319.77 kj/mole. This capture of sulfur dioxide may be done in a fluid bed equipped with steam coils or other heat recovery means whereby the heat produced by capturing the sulfur dioxide is used to raise steam for the process or put to other valuable use. The air regeneration step described above may be done with air at or near ambient pressure or with elevated pressure air. In the latter case the $SO_2$ containing gas leaving the regeneration step will be at elevated pressure and can be used as the fluidizing gas for a fluid bed of $CaCO_3$ operating at elevated pressure, i.e. 3 to 10 atmospheres. The hot elevated pressure gas coming out of this fluid bed may be used to drive a gas turbine.

For natural gas in which the ratio of $H_2S$ to $CH_4$ is less than the cases discussed above, the reforming of $CH_4$ will consume more heat than is provided by the capture and oxidation of the H$_2$S. Additional heat may be provided by the cyclic oxidation and reduction of the nickel catalyst or by the cyclic oxidation and reduction of some other material.

Several practical advantages should be noted for the subject invention. The heat consumed by the reforming reactions is generated within the reactor, thereby avoiding the need to input heat through the reactor walls. This allows the use of insulation between the catalysts in the reactor and the walls of the reactor. Since the walls can remain cool, the reactor can operate at high pressure, i.e., the pressure at which natural gas comes directly from the wellhead. Since syngas is produced at this high pressure, it can be converted to methanol, liquid hydrocarbons, or other valuable and readily shipped materials without requiring an expensive compression step. Thus, the subject invention solves a critical problem associated with the use of static gas.

In the conversion of the syngas to shippable products, nitrogen is considered an inert gas and will be readily removed from the products. This is also true for any CO$_2$ that is not removed by the reforming process. Thus, the subject invention also solves those problems associated with static gas.

The subject invention is also a clear improvement over the prior art as shown in U.S. Pat. No. 5,827,496. As noted above, in the '496 patent the fuel is steam reformed in the presence of CaO. The presence of additional CO$_2$ in the fuel being reformed is a distinct disadvantage because it increases CaO consumption. In the subject invention, however, the presence of CO$_2$ in the fuel actually creates a process advantage since it dramatically increases product yield.

The invention also represents an improvement over the prior art in terms of energy efficiency. In the prior art, the removal of H$_2$S was necessary and consumed significant amounts of energy. Here, however, the H$_2$S serves as a source of energy due to the exothermic reaction involved. In addition to $\Delta H=-519.80$ kj/mole of H$_2$S discussed above the reaction CaCO$_3$+SO$_2$+0.5O$_2$=CaSO$_4$+CO$_2$ is exothermic by $\Delta H=-319.77$ kj/mole. Thus, the downstream removal of the SO$_2$ serves as a source of heat energy that can be used to produce steam (or for other purposes), further improving the energy efficiency of the entire process.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for converting a sour natural gas stream into syngas containing hydrogen, methane, carbon monoxide and carbon dioxide, said syngas being substantially free of hydrogen sulfide, said sour natural gas containing at least 0.1 moles of hydrogen sulfide per mole of methane, said method comprising the steps of:

reforming a feed stream containing said sour natural gas and steam by passing said feed stream over a metal-based catalyst to capture sulfur and form a metal sulfide, said metal-based catalyst selected from the group consisting essentially of NiO, Fe$_2$O$_3$, MnO, CuO, CoO, CdO and ZnO and mixtures thereof;

regenerating said metal-based catalyst by contacting said metal sulfide formed during said reforming step with air, wherein the amount of heat consumed in said reforming step is balanced by the heat liberated in said regenerating step.

2. A method according to claim 1, wherein said sour natural gas has a ratio at least 0.3 moles of hydrogen sulfide per mole of methane.

3. A method according to claim 1, wherein a continuous stream of syngas is produced by repeatedly cycling multiple reactors between said reforming and regenerating steps.

4. A method according to claim 1, wherein said reforming and regenerating steps use a nickel-based catalyst and carried out at a temperature of at least 500° C.

5. A method according to claim 1, wherein said regenerating step produces vitiated air containing SO$_2$, said SO$_2$ being removed in a further step of passing said vitiated air over a fluidized bed of CaCO$_3$ at a pressure of between 3 and 10 atmospheres.

6. A method according to claim 1, wherein the pressure during said reforming step is at least 100 atmospheres.

7. A method according to claim 1, wherein said metal-based catalyst is supported on an inert carrier catalyst.

8. A method according to claim 1, wherein said metal-based catalyst is NiO and said reforming step includes a first phase wherein said NiO is reduced to Ni, said CH$_4$ is reformed to produce hydrogen and CO, and said H$_2$S reacts with NiO to produce NiS and H$_2$O.

9. A method according to claim 1, wherein said metal-based catalyst is NiO and said reforming step includes a second phase wherein substantially all of the NiO is reduced to Ni and the composition of the output gas from said reforming step changes from CO$_2$ and H$_2$O to an equilibrium mixture of hydrogen, H$_2$, CO, CO$_2$ and CH$_4$.

10. A method according to claim 1, wherein said metal-based catalyst is NiO and said regenerating step includes a first phase wherein said air reacts with the Ni formed during said reforming step to form NiO.

11. A method according to claim 1, wherein said metal-based catalyst is NiO and said regenerating step includes a second phase wherein said air reacts with NiS to form SO$_2$ and NiO.

* * * * *

UNITED STATES PATENT AND TRADEMARK OFFICE
CERTIFICATE OF CORRECTION

PATENT NO. : 6,797,253 B2
DATED : September 28, 2004
INVENTOR(S) : Lyon

It is certified that error appears in the above-identified patent and that said Letters Patent is hereby corrected as shown below:

Column 8,
Line 23, after the word "and" (second occurrence) insert the word -- are --

Signed and Sealed this

Fourth Day of January, 2005

JON W. DUDAS
*Director of the United States Patent and Trademark Office*